United States Patent [19]

Schupp et al.

[11] Patent Number: 4,594,136

[45] Date of Patent: Jun. 10, 1986

[54] CATHODIC ELECTROCOATING BINDERS

[75] Inventors: Eberhard Schupp, Schwetzingen; Werner Loch, Erpolzheim; Rolf Osterloh, Gruenstadt; Klaas Ahlers, Muenster, all of Fed. Rep. of Germany

[73] Assignee: BASF Aktiengesellschaft, Fed. Rep. of Germany

[21] Appl. No.: 755,725

[22] Filed: Jul. 17, 1985

Related U.S. Application Data

[62] Division of Ser. No. 547,085, Oct. 31, 1983, Pat. No. 4,542,193.

[30] Foreign Application Priority Data

Mar. 30, 1983 [DE] Fed. Rep. of Germany ....... 3311512

[51] Int. Cl.$^4$ ............................................. C25D 13/00
[52] U.S. Cl. .................. 204/181.7; 524/901; 525/490
[58] Field of Search ............ 204/181 C, 181 R, 181.7; 524/901; 525/490

[56] References Cited

U.S. PATENT DOCUMENTS

| | | |
|---|---|---|
| 4,248,753 | 2/1981 | Buchwalter et al. ............ 523/415 X |
| 4,316,784 | 2/1982 | Buchwalter et al. ............ 204/181 C |
| 4,336,116 | 6/1982 | Schupp et al. ................. 204/159.11 |
| 4,340,714 | 7/1982 | Schupp et al. ......................... 528/99 |
| 4,395,502 | 7/1983 | Hönig et al. ......................... 523/415 |

*Primary Examiner*—Theodore E. Pertilla
*Attorney, Agent, or Firm*—Keil & Weinkauf

[57] ABSTRACT

Binders useful for cathodic electrocoating are water-dilutable on addition of acid and comprise a mixture of (A) a polyadduct which carries basic nitrogen groups and contains groups of the formula (I) and/or (II)

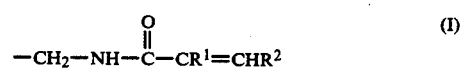

(I)

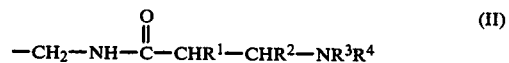

(II)

where $R^1$ and $R^2$ are hydrogen or methyl and $R^3$ and $R^4$ are alkyl or hydroxyalkyl or together are a 5- or 6-membered ring, and (B) a reaction product of a polyisocyanate and an olefinically unsaturated amine which carries a secondary amino group and a methacrylamide or methacrylate group.

4 Claims, No Drawings

CATHODIC ELECTROCOATING BINDERS

This is a division of application Ser. No. 547,085, filed Oct. 31, 1983, now U.S. Pat. No. 4,542,193.

The present invention relates to cathodic electrocoating binders based on a mixture of a polyadduct which contains basic nitrogen groups and a blocked polyisocyanate.

Polyadducts which carry basic nitrogen groups and contain groupings of the formula (I) and/or (II)

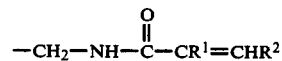

(I)

(II)

where $R^1$ and $R^2$ are identical or different and each is hydrogen or methyl, and $R^3$ and $R^4$ are identical or different and each is alkyl or hydroxyalkyl or $R^3$ and $R^4$ together are a 5- or 6-membered ring, can be prepared, for example, as described in German Laid-Open Applications DOS 2,942,488 (U.S. Pat. No. 4,336,716) and DOS 3,021,300 (U.S. Pat. No. 4,340,714). These products can be used as cathodic electrocoating binders and have a number of very good properties, such as high stability of the coating baths in which they are used, a good anti-corrosion action, great throwing power and low baking losses.

When used in finishes, these products are advantageously hardened at about 180° C., but if hardening catalysts, such as manganese salts or cobalt salts, are added, they crosslink at as low a baking temperature as 170° C. to give hard and resilient films. It is an object of the present invention to lower the baking temperature even more and hence to realize a further saving in energy. It is a further object to make the paint films even more resilient.

We have found that these objects are achieved by using binders which additionally contain a reaction product of a polyisocyanate and an unsaturated amine.

Accordingly, the present invention relates to a binder which is water-dilutable on addition of acid, is suitable for preparing cathodic electrocoating compositions and comprises a mixture of
(A) from 60 to 95% by weight of a polyadduct which carries basic nitrogen groups and contains groupings of the formula (I) and/or (II)

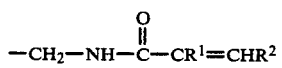

(I)

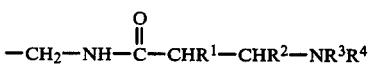

(II)

where $R^1$ and $R^2$ are identical or different and each is hydrogen or methyl, and $R^3$ and $R^4$ are identical or different and each is alkyl of 1 to 9 carbon atoms or hydroxyalkyl of 2 to 10 carbon atoms, or $R^3$ and $R^4$ together are a 5- or 6-membered ring and
(B) from 5 to 40% by weight of a reaction product of a polyisocyanate and an olefinically unsaturated amine which carries a secondary amino group and a methacrylamide or methacrylate group.

The present invention also relates to the use of this binder in a protonated form for cathodic electrocoating.

The components from which the binder is prepared will now be described in detail.

Products described in German Laid-Open Application DOS 2,934,467 (U.S. Pat. Nos. 4,246,753 and 4,316,784) can be used as the polyadduct (A) carrying basic nitrogen groups. They can be prepared, for example, by first reacting a polymeric polyol with N-alkoxymethyl(meth)acrylamide and then forming an adduct of the resulting unsaturated polymer with a primary or secondary amine. Since the α,β-unsaturated amide groups in these products are bonded to the polymer molecule via methyl ether bridges, these materials are not very resistant to hydrolysis.

Component (A) is preferably a product as described in German Laid-Open Application DOS 2,942,488 (U.S. Pat. No. 4,336,116), i.e. a polyadduct which carries basic nitrogen groups, has an average molecular weight of from 500 to 10,000, and contains groups of the formula (I) bonded to aromatic rings. Polyadducts of this type can be prepared, for example, as described in German Laid-Open Application DOS 2,942,488 (U.S. Pat. No. 4,336,116), from monophenols and/or polyphenols which carry groups of the formula (I), polyepoxides and amines or amine salts.

Further products preferred for use as component (A) can be prepared in accordance with German Laid-Open Application DOS 3,021,300 (U.S. Pat. No. 4,340,914), i.e. by taking
(a) a monophenol and/or polyphenol which carries groups of the formula (I)

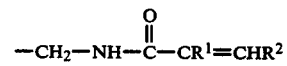

where $R^1$ and $R^2$ are identical or different and each is hydrogen or methyl, and forming an adduct with
(b) an amine having one or more primary and/or secondary amino groups, and reacting the product with
(c) an epoxy compound having from 1 to 4 epoxide groups per molecule and a molecular weight of not more than 2,500, and using the components (a) and (c) in amounts which are such that the ratio of the phenolic hydroxyl groups of (a) to epoxide groups of (c) is from 1:0.5 to 1:2, and using the amine (b) in an amount which is such that the resulting polyadduct of (a), (b) and (c) contains from 0.1 to 5% by weight of basic nitrogen.

Component (A) is present in the binder mixture according to the invention in an amount of from 60 to 95, preferably from 65 to 85, % by weight.

According to the invention, component (B) is a reaction product of a polyisocyanate and an olefinically unsaturated amine which carries a secondary amino group and a methacrylamide or methacrylate group. German Laid-Open Application DOS 2,752,255 (U.S. Pat. No. 4,395,502) discloses reaction products of diisocyanates and/or triisocyanates with hydroxyethyl (meth)acrylate or hydroxypropyl (meth)acrylate. However, these products have little activity when used as crosslinking agents, so that baking temperatures of about 180° C. are used.

The use of component (B) according to the invention, however, makes it possible to produce fully hardened paint films without difficulty at 160° C. or, if hardening catalysts, such as manganese salts or cobalt salts, are used, even at as low a temperature as 140° C.

Component (B) can be prepared from any desired aliphatic, alicyclic and/or aromatic polyisocyanate. Examples of suitable polyisocyanates are diisocyanates, such as hexamethylene diisocyanate, isophorone diisocyanate, cyclohexane 1,4-diisocyanate, toluylene diisocyanate and diphenylmethane 4,4'-diisocyanate, triisocyanates, such as biuretized or isocyanurated hexamethylene diisocyanate, and the adduct formed from 3 moles of toluylene diisocyanate with 1 mole of trimethylolpropane. Even isocyanate prepolymers, for example adducts formed from diisocyanates with polyester polyols or polyether polyols, can be used as polyisocyanates. Especially suitable olefinically unsaturated amines which carry a secondary amino group and a methacrylamide or methacrylate group are those of the formula (III)

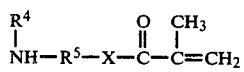
(III)

where $R^4$ is a hydrocarbon radical of 3 to 10 carbon atoms, which has one or more branchings on the carbon adjacent to the NH group, $R^5$ is an ethylene or propylene chain, X is oxygen or an NH bridge, and $R^4$ can be, for example, isopropyl, tert.-butyl, isoamyl or ethylhexyl and preferably is isopropyl or tert.-butyl.

An example of a particularly suitable olefinically unsaturated amine is isopropylaminipropylmethacrylamide.

To prepare component (B), either the amine can be added to the polyisocyante or the polyisocyante can be added to the amine. The reaction even proceeds at room temperature, but it can be speeded up by heating the mixture to about 150° C., preferably to about 100° C. If the starting materials and the reaction product are liquid at the reaction temperature, it is possible to carry out the reaction in the absence of a solvent, but in general the reaction will be carried out in an inert solvent, such as an ether, ester, ketone or hydrocarbon.

Component (B) is present in the binder mixture according to the invention in an amount of from 5 to 40, preferably from 15 to 35, % by weight.

Components (A) and (B) are dissolved in organic solvents, and the solutions are carefully mixed with each other, if appropriate at elevated temperatures. Then, possibly after the resin mixture has been milled together with pigments and auxiliaries, an acid, for example a carboxylic acid, such as formic acid, acetic acid or lactic acid, is stirred into the mixture to neutralize some or all of the basic groups, and the batch is then brought to the use concentration by diluting it with water. However, it is also possible to stir the unneutralized material into water to which acid has been added.

The binders according to the invention are preferably used as paint binders in the cathodic electrocoating of electrically conductive surfaces, for example on metal components, sheet or the like of brass, copper or aluminum metallized plastics or materials which have been coated with conductive carbon, and iron and steel which may have been chemically pretreated, for example phosphatized.

A cathodic electrocoating bath is generally made up with a solids content of from 5 to 30% by weight. The deposition process customarily takes place at 15°–40° C. in the course of from 1 to 5 minutes, at pH 4.0–8.5, preferably pH 5.5–8.0, and at a deposition voltage of from 50 to 500 volt. The electrically conductive body to be coated is connected as the cathode. The deposited film can be hardened above 140° C. in the course of about 20 minutes. If the electrocoating bath does not contain a hardening catalyst, it is advisable to harden at from about 160° C. to 180° C. The hardening catalyst can be added either to the organic solution of the resin or to the aqueous bath if the hardening catalyst is a water-soluble salt. Suitable hardening catalysts are heavy metal salts, e.g. salts of manganese or cobalt, although lead salts, especially if combined with one of the above metal salts, also have an accelerating action on the hardening process and thus enable the baking temperature to be lowered. The catalysts are advantageously used in amounts of from 5 to 1,000 ppm of metal, based on aqueous electrocoating bath.

The Examples illustrate the invention without limiting its scope. Parts and percentages are by weight, unless indicated otherwise.

EXAMPLE 1

Component A₁

63 parts of paraformaldehyde and 1 part of copper powder are added to 940 parts of phenol and 2,020 parts of methylolacrylamide. The mixture is dissolved by heating to 100° C., and is then cooled down to 55° C., and 10 parts of boron trifluoride diethyl etherate are added. After 1 hour at 55°–60° C., the same amount of catalyst is added once more, and the mixture is held at 60° C. for 3 hours. It is then heated to 115° C. and held at this temperature for 30 minutes, during which about 200 parts of water are distilled off. The mixture is then cooled down to 80° C. and is diluted with 1,200 parts of ethylene glycol. An amine adduct is prepared therefrom by adding 500 parts of diethanolamine and 2 parts of 2,6-di-tert.-butyl-p-cresol to 1,311 parts of this solution and heating at 90° C. for 2 hours.

In a separate vessel, 580 parts of fatty acid dimer with a trimer content of less than 4% and 210 parts of 2,2'-aminoethoxyethanol are heated to 200° C. in the course of 2 hours, during which the water formed is distilled off, and are held at this temperature for 6 hours. The resulting product, a diamidediol, has a residual acid number of 2.3 mg of KOH/g.

740 parts of a diglycidyl ether of bisphenol A with an epoxide equivalent weight of 500 are dissolved in 65 parts of hot xylene, 279 parts of the above diamidediol are added, and the mixture is heated to 130° C. 1.5 parts of dimethylbenzylamine are then added. The mixture is held at 130° C. until the epoxide equivalent weight of the resulting chain-lengthened epoxy resin has resen to 1,000. 431 parts of the above amine adduct and 15 parts of methyldiethanolamine are added. The mixture is then diluted with 211 parts of isobutanol and 211 parts of isopropanol to a 70% solids content and is stirred at 70° C. After 15–20 hours, the product has reached the desired viscosity of 1,000 mPa.s, measured at 75° C. in a disc cone viscometer.

Component B₁

566 parts of isopropylaminopropylmethacrylamide, 570 parts of dioxane, 0.3 part of hydroquinone monomethyl ether and 0.3 part of dibutyl-tin dilaurate are heated to 90° C. in a sealed nitrogen-flushed vessel. 573 parts of isocyanurated hexamethylene diisocyanate having an NCO content of 22% and dissolved in 560 parts of dioxane are then added dropwise in the course of 2 hours, and the mixture is held at 90° C. for a further 2 hours, during which the isocyanate content decreases to 0. The product has a solids content of 50%.

Preparation of the binder 680 parts of component $B_1$ are added to 1,950 parts of component $A_1$, and the two components are carefully mixed. 33 parts of acetic acid are then added.

EXAMPLE 2

Component $A_2$ 0.1 part of copper powder is added to 188 parts of phenol, 213 parts of acrylamide and 99 parts of paraformaldehyde, and the mixture is slowly heated. When 80° C. is reached, the mass has substantially liquefied. It is heated to 115° C. and is held at this temperature for 10 minutes, during which it becomes completely clear. It is cooled down to 55°–60° C., and 2 parts of boron trifluoride diethyl etherate are added. The temperature is held at 60° C., initially by cooling. After 1 hour, a further 2 parts of boron trifluoride diethyl etherate are added. The mixture is held at 60° C. for a further 3 hours and is then diluted with 292 parts of isobutanol. The temperature is raised to the boiling point, and about 50 parts of water are taken off in the course of 90 minutes. The product thus obtained has a solids content of 70%.

An amine adduct is prepared from the product by adding 43 parts of diethanolamine and 0.2 part of hydroquinone monomethyl ether to 120 parts of the solution and heating the mixture at 95° C. for 2 hours.

In a separate vessel, 564 parts of an epoxy resin based on bisphenol A and having an epoxide equivalent weight of 190, 137 parts of bisphenol A and 247.5 parts of a polycaprolactonediol having an average molecular weight of 550, and 260.5 parts of xylene are refluxed, and water contained in the mixture is separated off. 200 parts of xylene are then taken off under reduced pressure. 1.25 parts of dimethlybenzylamine are added at 150° C., and the mixture is held at 160° C. for 1 hour. It is then cooled down to 130° C., a further 1.9 parts of dimethylbenzylamine are added, and the mixture is held at 130° C. until the epoxide value has dropped to 0.11 epoxide group/100 g, which takes 2–4 hours.

109 parts of the above amine adduct and 2.15 parts of dimethylethanolamine are added to 300 parts of the above mixture. 56.6 parts of isopropanol and 56.6 parts of isobutanol are added to bring the solids content to 70%, and the mixture is heated at 70° C. After 20 hours the product has a viscosity of 900 to 1,100 mPa.s, measured at 75° C. Its amine number is 45.3 mg of KOH/g of solid resin.

Component $B_2$ 86 parts of isopropylaminopropylmethacrylamide, 83.3 parts of dioxane, 0.05 part of hydroquinone monomethyl ether and 0.1 part of dibutyl-tin dilaurate are heated to 70° C. in a sealed nitrogen-flushed vessel. 121 parts of an isocyanate prepolymer prepared from 1 mole of trimethylolpropane and 3 moles of toluylene diisocyanate having an isocyanate content of 17.3%, dissolved in 40 parts of ethyl acetate and 83 parts of dioxane are then added dropwise in the course of 1 hour. After a further hour the isocyanate content has decreased to 0.

Preparation of the binder 183 parts of component $B_2$ are added to 520 parts of component $A_2$, and the two components are carefully mixed. Addition of 8 parts of glacial acetic acid makes the product water-dispersible.

EXAMPLE 3

Component $A_3$

An amide-amine is first prepared from 290 parts of linoleic acid and 104 parts of aminoethylethanolamine. For this purpose, the components are heated to 200° C. in the course of 1 hour.

The mixture is then held at 200° C. for 3½ hours. A total of 18 parts of water are distilled off. On cooling down the product solidifies into a waxy mass and has a basic nitrogen content of 3.5%, of which 3.3% is in the form of secondary amine and 0.2% in the form of primary amine.

600 parts of phenol, 485 parts of bisphenol A, 1,000 parts of acrylamide, 490 parts of paraformaldehyde and 1 part of 2,6-di-tert.-butyl-p-cresol are introduced in succession into a stirred vessel and are heated with stirring at 120° C. until a clear solution has formed. The solution is cooled down to 50° C., and 10 parts of boron trifluoride dimethyl etherate are added. The temperature is held at 50° C. by cooling, until the reaction has died down. The mixture is then heated to 100° C. and held at this temperature for 30 minutes, during which the water formed in the reaction is distilled off under reduced pressure. The product left behind is then diluted with 1,000 parts of isobutanol to a solids content of 70%.

40 parts of the above amide-amine, 40 parts of diethanolamine and 0.1 part of 2,6-di-tert.-butyl-p-cresol are added to 157.5 parts of this product, and the mixture is heated at 80° C. for 1 hour. 120 parts of an epoxy resin based on bisphenol A and epichlorohydrin and having an epoxide equivalent weight of 190 (for example ®Epikote 828) and 93 parts of isopropanol are then added and the mixture is heated at 85° C. for 15 hours.

Component $B_3$ 566 parts of isopropylaminopropylmethacrylamide, 475 parts of dioxane, 0.3 part of hydroquinone monomethyl ether and 0.3 part of dibutyl-tin dilaurate are heated to 100° C. in a sealed vessel. A mixture of 576 parts of biuretized hexamethylene diisocyanate (for example ®Desmodur N from Bayer AG) with an isocyanate content of 21.9%, 81 parts of xylene, 81 parts of ethylene glycol acetate and 475 parts of dioxane are then added dropwise in the course of 2 hours and the mixture is held at this temperature for 1 hour, during which the isocyanate content decreases to 0.

Preparation of the binder 158 parts of component $B_3$ are added to 450 parts of component $A_3$, and the two components are carefully mixed. Addition of 12 parts of acetic acid makes the product water-dilutable.

EXAMPLE 4

Preparation of the binder 183 parts of component $B_3$ are added to 520 parts of component $A_2$, and the two components are carefully mixed. 8 parts of glacial acetic acid are then added.

COMPARATIVE EXAMPLE

Instead of component (B), an unsaturated triurethane is prepared as described in German Laid-Open Application DOS 2,752,255. The method of preparation is the same as that for component B3, except that 390 parts of hydroxyethyl methacrylate are used in place of 566 parts of isopropylaminopropylmethacrylamide, and the amount of dioxane used is only 299 parts instead of 475 parts.

Preparation of the binder 134 parts of the above triurethane are added to 520 parts of component A2, and the two components are carefully mixed. 8 parts of glacial acetic acid are then added.

Testing the binders

In each case, 308 parts of binder solution are diluted with 692 parts of fully demineralized water to a solids content of 20%, 40 parts of kaolin, 6 parts of basic lead silicate pigment and 4 parts of carbon black are added, followed by grinding medium, and the mixture is ball-milled for 24 hours. The grinding medium is then separated off. 666 parts of fully demineralized water are added to adjust the solids content in the bath to 15%. The baths are stirred at 30° C. for 48 hours. Paint films are deposited at the voltage shown in the following Table in the course of 2 minutes onto zinc-phosphatized steel test panels connected as the cathode, and are baked at 180° C., at 160° C. and at 140° C. for 20 minutes. Thereafter the baked films are tested for resistance to acetone by rubbing them backwards and forwards 50 times with an acetone-impregnated cottonwool pad, and the resilience is examined in the form of a reverse impact test. The following Table shows the results:

| | | Result of binder test; 17 μm film thickness | | | | | | |
|---|---|---|---|---|---|---|---|---|
| | | Ford throwing power with a 17μ outside | Acetone resistance | | | Reverse impact in × lb | | |
| Binder | pH | film thickness | 180° C. | 160° C. | 140° C. | 180° C. | 160° C. | 140° C. |
| Example 1 | 6.7 | 17 cm (270 V) | 1 | 1 | 3 | 160 | 160 | 40 |
| | | | 1* | 1* | 1* | 160* | 160* | 120* |
| Example 2 | 6.6 | 16 cm (260 V) | 1 | 1 | 2 | 160 | 160 | 40 |
| | | | 1* | 1* | 1* | 160* | 160* | 160* |
| Example 3 | 6.2 | 18 cm (320 V) | 1 | 1 | 3 | 80 | 40 | 20 |
| | | | 1* | 1* | 2* | 160* | 160* | 30* |
| Example 4 | 6.6 | 15.5 cm (250 V) | 1 | 1 | 2 | 160 | 160 | 40 |
| | | | 1* | 1* | 1* | 160* | 160* | 120* |
| Comparative Example | 6.5 | 15 cm (250 V) | 1 | 5 | 6 | 40 | <20 | <20 |
| | | | 1* | 3* | 6 | 160* | 40 | <20 |

*Baths contain 50 ppm of manganese in the form of manganese acetate
Acetone resistance: 1 = very good, 6 = inadequate

We claim:

1. A method of cathodic electrocoating of electrically conductive surfaces in which the electrically conductive surfaces to be coated are connected as the cathode and dipped into an aqueous cathodic electrocoating bath containing a binder, which bath has a solids content of from 5 to 30% by weight, a temperature of 15° to 40° C., and a pH of 4.0 to 8.5, the deposition being effected at a voltage of from 50 to 500 volt and hardening the deposited film at above 140° C., wherein the binder is water-dilutable on addition of acid, is suitable for preparing cathodic electrocoating compositions and comprises a mixture of (A) from 60 to 95% by weight of a polyadduct which carries basic nitrogen groups and contains groupings of the formula (I) or (II) or (I) and (II)

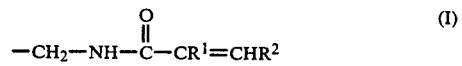

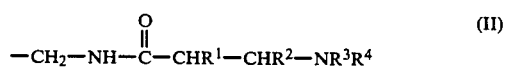

where $R^1$ and $R^2$ are identical or different and each is hydrogen or methyl, and $R^3$ and $R^4$ are identical or different and each is alkyl of 1 to 9 carbon atoms or hydroxyalkyl of 2 to 10 carbon atoms, or $R^3$ and $R^4$ together are a 5- or 6-membered ring and (B) from 5 to 40% by weight of a reaction product of a polyisocyanate and an olefinically unsaturated amine which carries a secondary amino group and a methacrylamide or methacrylate group.

2. The method of claim 1 wherein a reaction product of claim 1 wherein a reaction product of a polyisocyanate and isopropylaminopropylmethacrylamide is used as component (B) of the binder.

3. The method of claim 1 wherein a polyadduct in which the groups of the formulae (I) or (II) or (I) and (II) are bonded to aromatic rings is used as component (A).

4. The method of claim 2 wherein a polyadduct in which the groups of the formulae (I) or (II) or (I) and (II) are bonded to aromatic rings is used as component (A).

* * * * *